(12) United States Patent
Shimizu

(10) Patent No.: US 11,486,779 B2
(45) Date of Patent: Nov. 1, 2022

(54) TACTILE SENSOR AND ANDROID

(71) Applicant: JTEKT CORPORATION, Osaka (JP)

(72) Inventor: Yohei Shimizu, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/005,395

(22) Filed: Aug. 28, 2020

(65) Prior Publication Data

US 2020/0393314 A1 Dec. 17, 2020

Related U.S. Application Data

(63) Continuation of application No. 16/211,834, filed on Dec. 6, 2018, now Pat. No. 10,852,206.

(30) Foreign Application Priority Data

Dec. 13, 2017 (JP) .................. 2017-238622

(51) Int. Cl.
  *G01L 5/22* (2006.01)
  *B25J 13/08* (2006.01)
  *G01L 1/12* (2006.01)

(52) U.S. Cl.
  CPC ............. *G01L 5/228* (2013.01); *B25J 13/084* (2013.01); *G01L 1/127* (2013.01)

(58) Field of Classification Search
  CPC ........ G01L 5/228; G01L 1/127; B25J 13/084; H01F 17/0013
  USPC .................................................... 73/862.046
  See application file for complete search history.

(56) References Cited

U.S. PATENT DOCUMENTS

| | | | | |
|---|---|---|---|---|
| 5,811,969 A | * | 9/1998 | Kyodo ................. | G01D 5/2013 324/207.16 |
| 6,154,028 A | | 11/2000 | Bushida et al. | |
| 6,960,911 B2 | * | 11/2005 | Inoue ........................ | G01L 9/16 324/207.11 |
| 7,427,909 B2 | * | 9/2008 | Ono ..................... | H01F 1/15366 336/90 |
| 7,859,377 B2 | * | 12/2010 | Kawarai ............. | H01F 17/0006 336/83 |
| 7,868,628 B2 | * | 1/2011 | Shimazawa ......... | H01F 17/0006 324/655 |
| 9,323,186 B2 | | 4/2016 | Kita et al. | |
| 2012/0019236 A1 | | 1/2012 | Tiernan et al. | |
| 2015/0022309 A1 | * | 1/2015 | Marusawa ............... | C08K 3/08 336/221 |
| 2019/0027288 A1 | * | 1/2019 | Sato ....................... | H01F 27/022 |
| 2020/0116577 A1 | * | 4/2020 | Kawabayashi ......... | G01L 1/127 |
| 2021/0098182 A1 | * | 4/2021 | Takatsu ............... | H01F 27/2823 |

FOREIGN PATENT DOCUMENTS

JP 2013-178241 A 9/2013

* cited by examiner

*Primary Examiner* — Octavia Davis Hollington
(74) *Attorney, Agent, or Firm* — Oliff PLC

(57) ABSTRACT

A tactile sensor has an elastically deformable sheet, a coil that is provided in the sheet, a powdery or fibrous magnetic material that is provided in the sheet with the coil, and a detection portion that detects an inductance of the coil. The coil is wound in a spiral shape and the powdery or fibrous magnetic material is dispersed in the sheet.

2 Claims, 5 Drawing Sheets

TACTILE SENSOR AND ANDROID

INCORPORATION BY REFERENCE

This is a continuation application of U.S. patent application Ser. No. 16/211,834, filed Dec. 6, 2018, which claims priority to Japanese Patent Application No. 2017-238622 filed on Dec. 13, 2017. Each of the above applications, including the specification, drawings and abstract, is incorporated herein by reference in its entirety.

BACKGROUND OF THE INVENTION

1. Field of the Invention

The present invention relates to a tactile sensor and an android.

2. Description of the Related Art

In recent years, androids (machines imitating humans) are being developed. An android has a mechanical portion that is a skeleton and a skin portion that covers the mechanical portion. The skin portion is made of flexible material such as silicone rubber.

The android may be equipped with a tactile sensor. As disclosed in Japanese Patent Application Publication No. 2013-178241 (JP 2013-178241 A), a configuration in which electrodes are provided on both surfaces of a piezo film is known as an example of the tactile sensor. With this tactile sensor, when a human touches the android, the tactile sensor outputs signals and a control device of the android detects the contact with the human.

Conventional tactile sensors are dispersed across the mechanical portion that is the skeleton and are covered by the skin portion. Thus, when an area of the skin portion of the android is pushed continuously, signals are output from the tactile sensor so that a load can be detected in a tactile sensor installation area. However, signals are not output in an area between the tactile sensors. That is, even though the android is being touched continuously, the android determines that it is being touched intermittently. Such a tactile sensor is used for devices other than androids.

SUMMARY OF THE INVENTION

One object of the present invention is to provide a tactile sensor that is able to continuously detect a load and an android that has such a tactile sensor.

According to an aspect of the present invention, the tactile sensor includes an elastically deformable sheet, a coil that is provided in the sheet, a powdery or fibrous magnetic material that is provided in the sheet with the coil, and a detection portion that detects an inductance of the coil.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6 is a graph illustrating a relationship between an amount by which the tactile sensor is pushed in (push-in amount) and the inductance of the coil when the tactile sensor is pushed in.

DETAILED DESCRIPTION OF EMBODIMENTS

Figure 1:
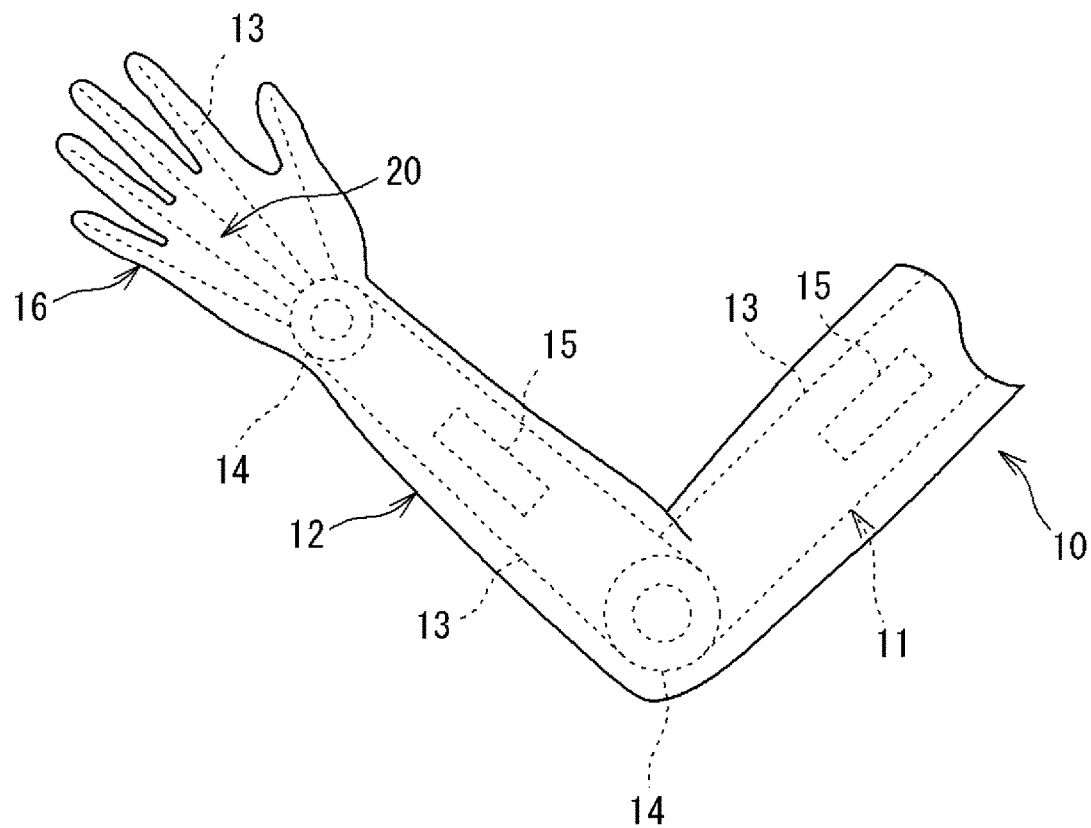
FIG. 1 is a perspective view of a part (arm) of an android.

FIG. 1 is a diagram illustrating a perspective view of a part (arm) of an android. An android 10 has a mechanical portion 11 that is a skeleton and a skin portion 12 that covers the mechanical portion 11. The mechanical portion 11 includes a plurality of arm members 13, joints 14 that connect the arm members 13, and actuators 15. Each joint 14 includes a plurality of mechanical elements such as a shaft that moves integrally with the arm members 13 and a bearing. Each actuator 15 is formed of a motor or a fluid actuator, for example. When the actuator 15 is operated, the arm members 13 are bent or extended linearly as a whole by the joint 14. The mechanical portion 11 may have a configuration other than the one shown, and may have a conventionally known configuration.

The skin portion 12 is configured of an elastic film member (sheet). At least a part of the film member has a function of a tactile sensor 20. In the case of the android 10 shown in FIG. 1, the skin portion 12 of a hand mechanism 16 (palm) that has fingers is formed of the tactile sensor 20. The skin portion 12 of an arm portion may be formed of the tactile sensor 20, or the entire area of the skin portion 12 shown in FIG. 1 may be the tactile sensor 20. The skin portion 12 (film member) is made of a rubber material that is easily elastically deformed. The skin portion 12 may be made of ethylene-propylene-diene rubber (EPDM), acrylic rubber, or silicone rubber, for example.

Figure 2:
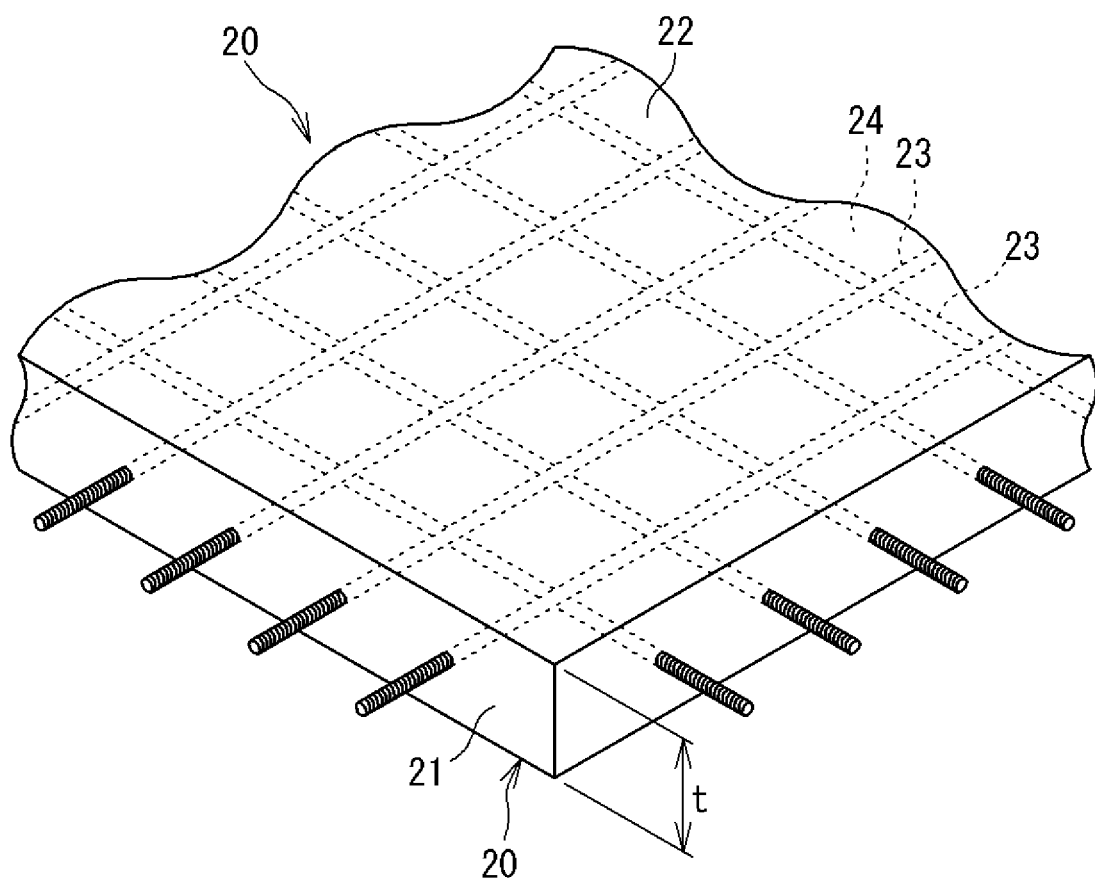
FIG. 2 is a diagram explaining a configuration of a tactile sensor.
Figure 3:
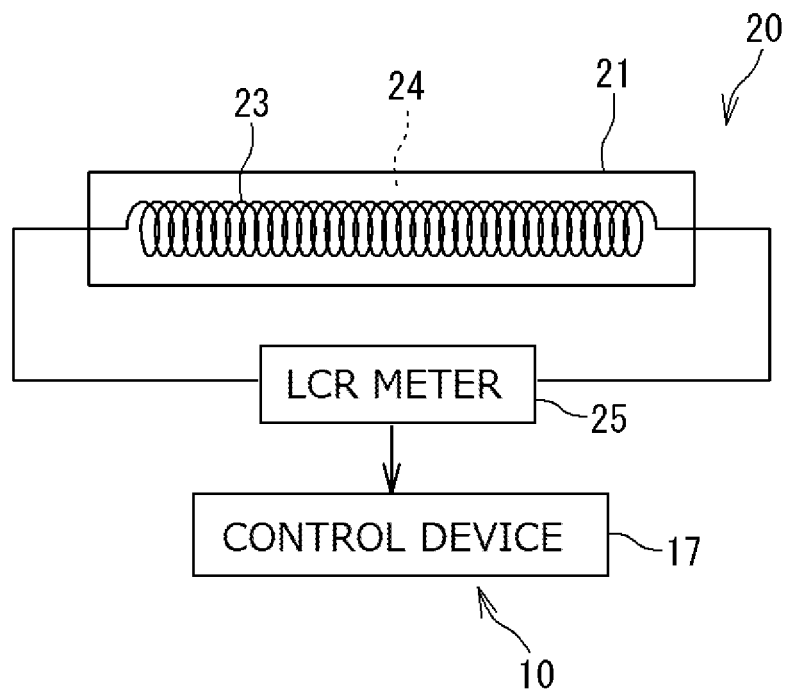
FIG. 3 is a diagram explaining a function of the tactile sensor.

FIG. 2 is a diagram illustrating the configuration of the tactile sensor 20. FIG. 3 is a diagram explaining a function of the tactile sensor 20. The tactile sensor 20 has an elastically deformable sheet 21, coils 23 provided in the sheet 21, a magnetic material 24, and a detection portion 25 (see FIG. 3).

The sheet 21 is made of polymer material. In the present embodiment, the sheet 21 is made of rubber. The sheet 21 can be configured of the same material as the skin portion 12 (for example, EPDM). In FIG. 2, a thickness t of the sheet 21 is thin (for example, less than 10 millimeters) and the sheet 21 is easily elastically deformed in a thickness direction. The sheet 21 is flexible as a whole. When bending force is applied, the sheet 21 is easily elastically deformed in the bending direction. A surface (front surface) 22 of the sheet 21 is a part of a front surface (outer surface) of the skin portion 12.

The coils 23 are provided in the sheet 21. The coils 23 are embedded in the sheet 21 along a direction parallel to a surface 22 of the sheet 21. In the tactile sensor 20 shown in FIG. 2, the coils 23 are arranged in a mesh form in the sheet 21.

Figure 4:
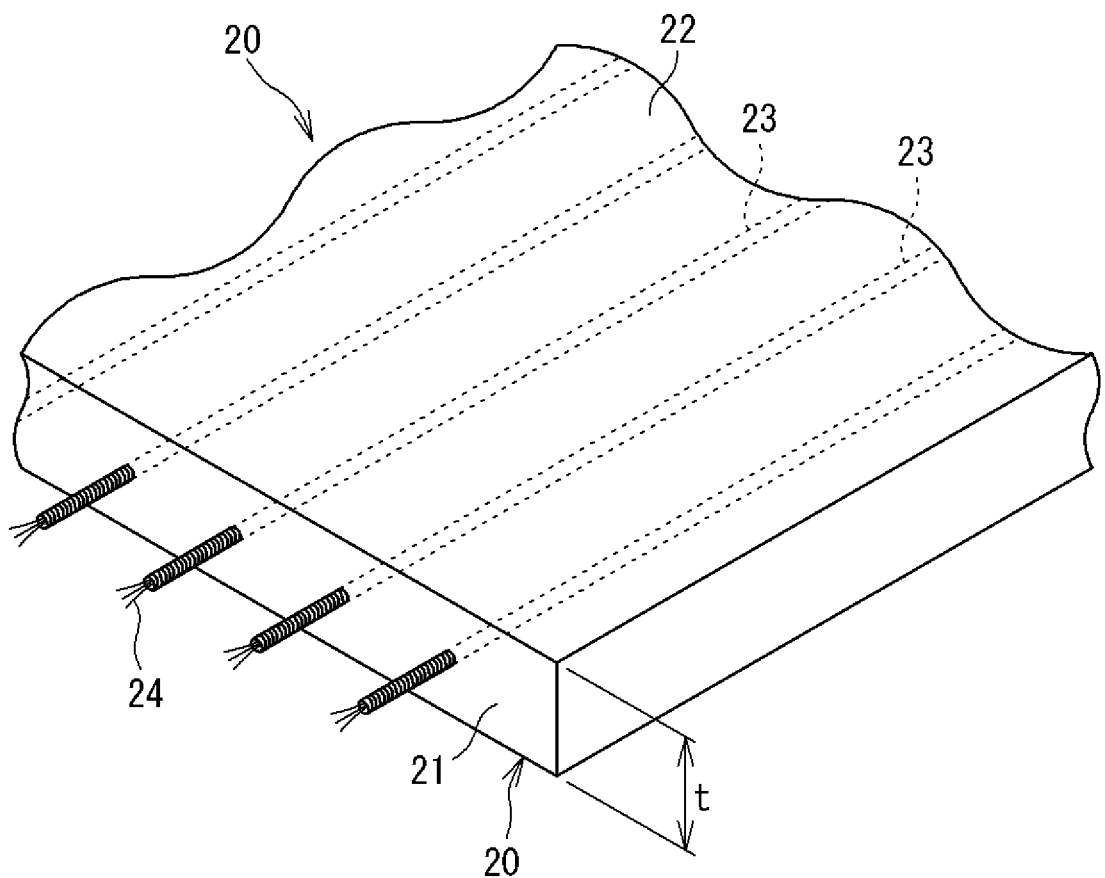
FIG. 4 is a diagram explaining the configuration of the tactile sensor of a different form.

The coils 23 may be arranged in a way other than the mesh form. The coils 23 may be arranged in parallel along one direction, as shown in FIG. 4. Even in the example illustrated in FIG. 4, the coils 23 are embedded in the sheet 21 along the direction parallel to the surface 22 of the sheet 21.

In the configurations shown in FIGS. 2 and 4, the coils 23 are provided in a center area of the sheet 21 in a thickness direction. In order to obtain this configuration, when the sheet 21 is formed (vulcanized) in a mold by using rubber, the coils 23 should be disposed beforehand in a cavity of the mold.

When the sheet 21 is formed, the magnetic material 24 is embedded in the sheet 21 at the same time. That is, the magnetic material 24 is provided in the sheet 21 with the coils 23. The magnetic material 24 is powdery or fibrous. A specific example of the magnetic material 24 will be described. The magnetic material 24 is an amorphous metal fiber (for example, "Sency" (registered trademark) manufactured by Aichi Steel). The amorphous metal fiber is chopped (for example, to a length of 50 to 150 micrometers) to obtain the powdery magnetic material (magnetic powder material) 24. The magnetic material 24 is kneaded with the rubber that forms the sheet 21. The magnetic material 24 may be used in the fibrous state (linear state) without being chopped and with its length being the same as that of the coils 23.

When the coils 23 are arranged in the mesh form, as shown in FIG. 2, it is preferable that the magnetic material 24 be powdery. That is, the powdery magnetic material 24 is dispersed in the sheet 21. Suppose intervals between the coils 23 are wide even when the coils 23 are arranged in the mesh form, or the coils 23 are disposed in parallel along one direction, as shown in FIG. 4. In such cases, it is preferable that the magnetic material 24 be fibrous. When the magnetic material 24 is fibrous, the magnetic material 24 is provided along a longitudinal direction of each coil 23. In the example illustrated in FIG. 4, a plurality (for example, three strands) of the fibrous magnetic materials 24 is inserted in the center of each coil 23.

Each coil 23 is an enameled wire (strand) wound in a spiral shape, and is long and thin. The full length of the coil 23 may be changed according to the length of the sheet 21. The diameter of the coil 23 is equal to or less than one millimeter and the diameter of the strand is equal to or less than 0.1 millimeters. The coil 23 is an extremely small coil. Each coil 23 is provided to be electrically independent from the other coils 23. As shown in FIG. 3, the detection portion 25 is connected to the coil 23. The detection portion 25 is an LCR meter that detects an inductance of the coil 23. The detection portion 25 is able to detect the inductance of the coil 23 as well as a variation (temporal variation) in the inductance. The detection portion 25 outputs the detected inductance and the variation as signals.

The inductance of the coil 23 is expressed by the following formula.

$$L = \frac{\mu_0 K N^2 A}{l} \qquad [\text{Eq. 1}]$$

where
L=Inductance (H)
$\mu_0$=Permeability=$4\pi \times 10^{-7}$ H/m
K=Coefficient
N=Winding number
A=Sectional area of coil (m$^2$)
l=Length of coil in axial direction (m)

In FIGS. 2 and 4, deformation of the sheet 21 causes the coils 23 to deform. Deformation of the coils 23 causes a length of each coil 23 in an axial direction to change. A sectional area of the coil 23 is also changed. Thus, when the sheet 21 is deformed, the inductance of each coil 23 embedded in the sheet 21 is changed. The inductance (variation in inductance) is measured by the detection portion 25.

In FIG. 3, the signals output from the detection portion 25 are input to a control device 17 provided in the android 10. The control device 17 is a computer. The variation (temporal variation) in the inductance detected by the detection portion 25 may be obtained by the control device 17. The control device 17 has a function of obtaining a load (pushing force) applied to the sheet 21 (tactile sensor 20) or information on modes of deformation (for example, displacement) of the sheet 21 caused by the load based on the signals from the detection portion 25. For example, the control device 17 has a table in which the load applied to the tactile sensor 20 or the modes of deformation caused by the load is associated with the signals (signal intensity) output from the tactile sensor 20. When the control device 17 obtains the signals from the tactile sensor 20, the control device 17 is able to obtain the load applied to the skin portion 12 (tactile sensor 20) of the android 10 or information on the modes of deformation caused by the load, by referring to the table.

Figure 5:
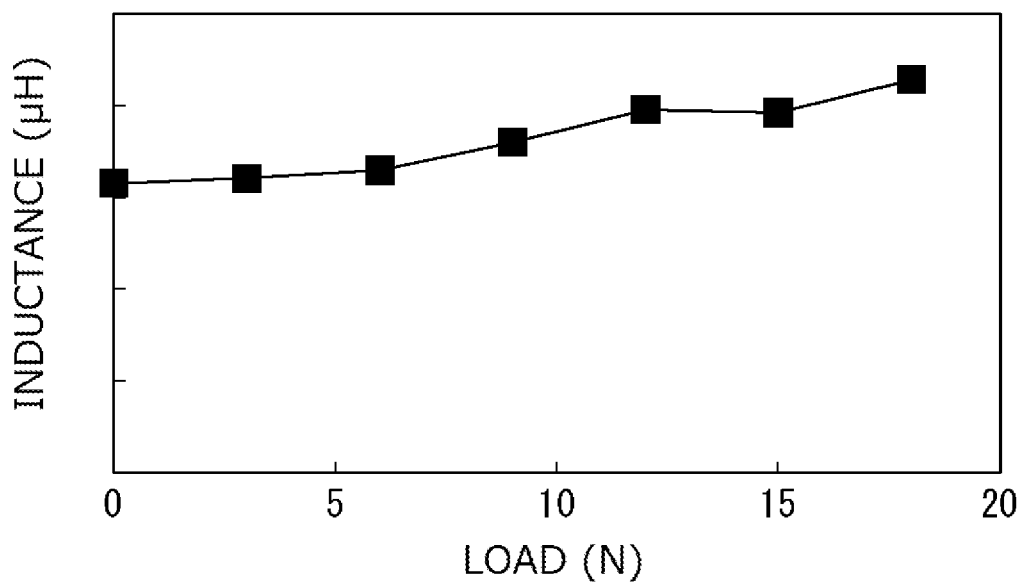
FIG. 5 is a graph illustrating a relationship between a load applied to the tactile sensor and an inductance of a coil when the load is applied.
Figure 6:
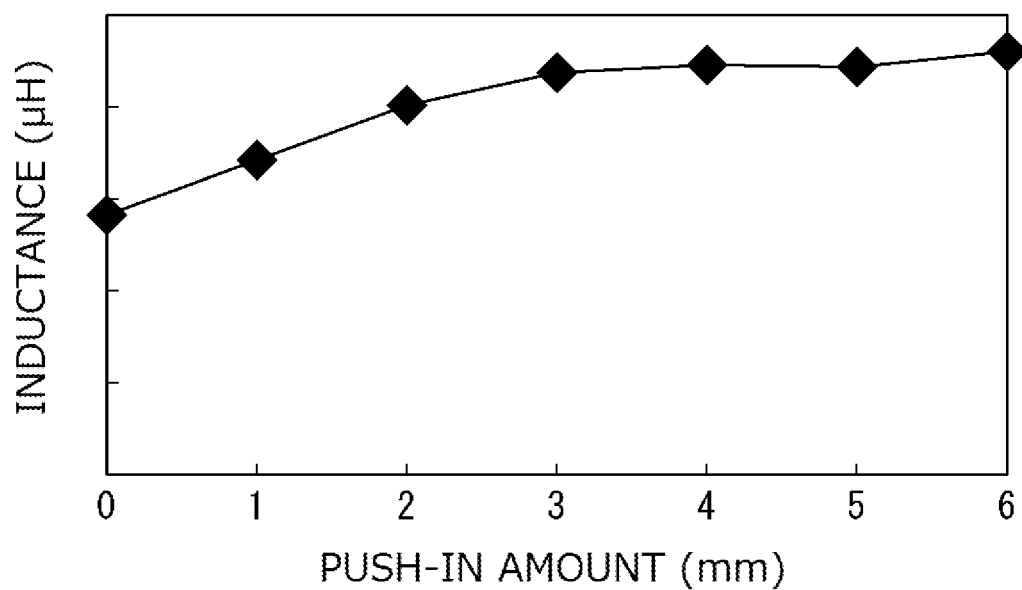

FIG. 5 is a graph illustrating a relationship (measured value) between the load applied to the tactile sensor 20 and the inductance of the coil 23 when the load is applied. FIG. 6 is a graph illustrating a relationship (measured value) between the amount by which the tactile sensor 20 is pushed in (push-in amount) and the inductance of the coil 23 when the tactile sensor 20 is pushed in. The results shown in FIGS. 5 and 6 are the actual measured values of one coil 23 of the tactile sensor 20 illustrated in FIG. 2. As illustrated in FIGS. 5 and 6, when the load applied to the tactile sensor 20 and the push-in amount of the tactile sensor 20 are changed, the inductance is also changed. Not just when the sheet 21 of the tactile sensor 20 is bent, but also when a pushing force is applied to the surface 22, a length of the coil 23 etc. is changed and thus, the inductance is changed. The relationships illustrated in FIGS. 5 and 6 are reproducible. The table can be created beforehand based on the information of the relationships. The created table may be stored in the control device 17.

The detection portion 25 provided in the tactile sensor 20 may be configured of a circuit that includes a microcomputer etc. The detection portion 25 may have the function of the control device 17.

As described above, the tactile sensor 20 of the present embodiment (see FIGS. 2 and 4) has the sheet 21, the coils 23, the powdery or fibrous magnetic material 24, and the detection portions 25 (see FIG. 3). The sheet 21 is elastically deformable. The coils 23 are provided in the sheet 21. The magnetic material 24 is provided in the sheet 21 with the coils 23. The detection portion 25 detects the variation in the inductance of the coil 23. In the tactile sensor 20, when the sheet 21 is pushed or bent, the coils 23 inside the sheet 21 are deformed with the sheet 21 and the inductance of each coil 23 is varied in accordance to the deformation. The detection portion 25 detects the inductance so that the deformation of the sheet 21 and the load applied to the sheet 21 can be detected from the variation in the inductance. The coils 23 are embedded in the sheet 21 along the direction parallel to the surface 22 of the sheet 21. Thus, when a load is continuously applied to an area of the sheet 21, the detection portion 25 can continuously detect the load. Furthermore, with the powdery or fibrous magnetic material 24, permeability can be increased so that the inductance (variation in inductance) is increased. Thus, the detection accuracy of the detection portion 25 can be increased. In the present embodiment, the number of parts is decreased, which enables the cost of the android 10 to be reduced. Additionally, the present embodiment excels in terms of weight reduction.

In the tactile sensor 20 illustrated in FIGS. 2 and 4, the coils 23 are not provided on (attached to) the front surface (surface 22) or a back surface of the sheet 21, but are provided inside the sheet 21 (that is, the coils 23 are embedded in the sheet 21). If the coils 23 are to be provided on the front surface or the back surface of the sheet 21, it is difficult to bond (attach) the coils 23 to the surface 22 and there is a risk of the coils 23 falling off during usage. However, in the present embodiment, the coils 23 are embedded in the sheet 21. Thus, the coils 23 can be stably fixed to the sheet 21.

In the case of a conventional android, its skin portion only functions as an epidermis (cover) of the android. A tactile sensor disposed in a mechanical portion inside the skin portion functions as a tactile sensing portion. The tactile sensor is provided as a configuration separate from the skin portion. In contrast, in the case of the tactile sensor 20 of the present embodiment, the elastically deformable sheet 21 provided in the tactile sensor 20 is (a part of) the skin portion 12 of the android 10 illustrated in FIG. 1. The coils 23 that function as the tactile sensing portion are embedded in the skin portion 12 (the sheet 21 that is part of the skin portion 12).

In the example illustrated in FIG. 2, the coils 23 are embedded so as to be arranged in the mesh form. Thus, when the sheet 21 is bent in various ways, it is possible to detect the ways in which the sheet 21 is bent. That is, by arranging the coils 23 in the mesh form, the amount of information that can be obtained is increased and the modes of deformation of the sheet 21 become more easily recognizable. When the coils 23 are arranged in the mesh form in the sheet 21, it is preferable that the magnetic material 24 be powdery and is dispersed in the sheet 21. In the configuration, the powdery magnetic material 24 is dispersed in the sheet 21 so that the inductance of the coils 23 can be increased.

In the example illustrated in FIG. 4, the magnetic material 24 is fibrous and is provided along the coil 23. Suppose intervals between the adjacent coils 23, 23 are wide. In such a case, even if the magnetic material 24 is provided in an area that is between the coils 23, 23 and that is spaced away from each coil 23, the effect on the increase of the inductance is small. Thus, when the intervals between the coils 23, 23 are wide, it is preferable that the magnetic material 24 be fibrous and is provided along the coil 23. With this configuration, it is possible to effectively increase the inductance of the coil 23.

A blending amount of the magnetic material 24 is equal to or more than 2 phr and is equal to or less than 10 phr (for example, around 5 phr). If the blending amount of the magnetic material 24 is increased, the effect of increasing the inductance is enhanced. However, an excessive amount of magnetic material 24 causes the sheet 21 to harden, and decreases the flexibility of the skin portion 12 of the android 10.

In the android 10 of the present embodiment, at least a part of the skin portion 12 should be configured of the tactile sensor 20 that has the configuration described above. In the embodiment illustrated in FIG. 1, the case where the tactile sensor 20 is provided in the hand mechanism 16 is described. However, the tactile sensor 20 may be provided in parts other than the hand mechanism 16. With this configuration, the elastically deformable sheet 21 of the tactile sensor 20 becomes (at least a part of) the skin portion 12 of the android 10. That is, the skin portion 12 can be equipped with the function of a tactile sensor. With the android 10, when an area of the skin portion which includes the tactile sensor 20 is continuously pushed, the load can be continuously detected. In the example illustrated in FIG. 1, when the android 10 shakes hands with a human, the android 10 detects the load and also detects the temporal variation of the load. Thus, the android 10 can determine the manner in which the human shook hands with the android 10 (for example, whether the human was friendly or hostile).

As described above, the android 10 that has the tactile sensor 20 of the present embodiment is able to obtain a precise sense of touch. Since the tactile sensor 20 has a sheet form as a whole, the tactile sensor 20 can easily be used as the skin portion 12 of the android 10.

The case where the tactile sensor 20 illustrated in FIGS. 2 and 4 is applied to the android 10 is described. However, the tactile sensor 20 may be used for other purposes. For example, the tactile sensor 20 may be used for a medical apparatus such as an artificial hand or may be used as various tactile sensors installed in an automobile.

The embodiments disclosed above are to be considered as illustrative and not restrictive in all respects. The scope of right of the present invention is not limited to the embodiments described above, and includes all modifications within the scope equivalent to the configuration described in the claims. The material of the sheet 21 may be a different material and may be changed in accordance with the use of the sheet 21. The material of the sheet 21 may be a material that has the adequate strength and excellent heat resistance and oil resistance etc.

With the present invention, the tactile sensor is able to continuously detect a load. An android that has such a tactile sensor is able to obtain a precise sense of touch like a human.

What is claimed is:

1. A tactile sensor comprising:
   an elastically deformable sheet;
   a coil that is provided in the sheet;
   a plurality of fibrous magnetic material that is dispersed in the sheet in a manner so as to directly contact the coil; and
   a detection portion that detects an inductance of the coil, wherein:
   the coil is wound in a spiral shape,
   the plurality of fibrous magnetic materials are provided in the spiral shape of the coil,
   the fibrous magnetic material includes a plurality of strands inserted at a center of the coil,
   the coil includes a plurality of coils, and the plurality of coils are arrange in a mesh form, and
   a spacing between adjacent ones of the plurality of oils is relatively wide so as to effectively increase the inductance of the coil.

2. The tactile sensor according to claim 1, wherein a blending amount of the fibrous magnetic material is equal to or more than 2 phr and is equal to or less than 10 phr.

* * * * *